Oct. 21, 1958    C. H. MILLERWISE    2,857,127
SOLENOID VALVE
Filed July 28, 1954    2 Sheets-Sheet 1
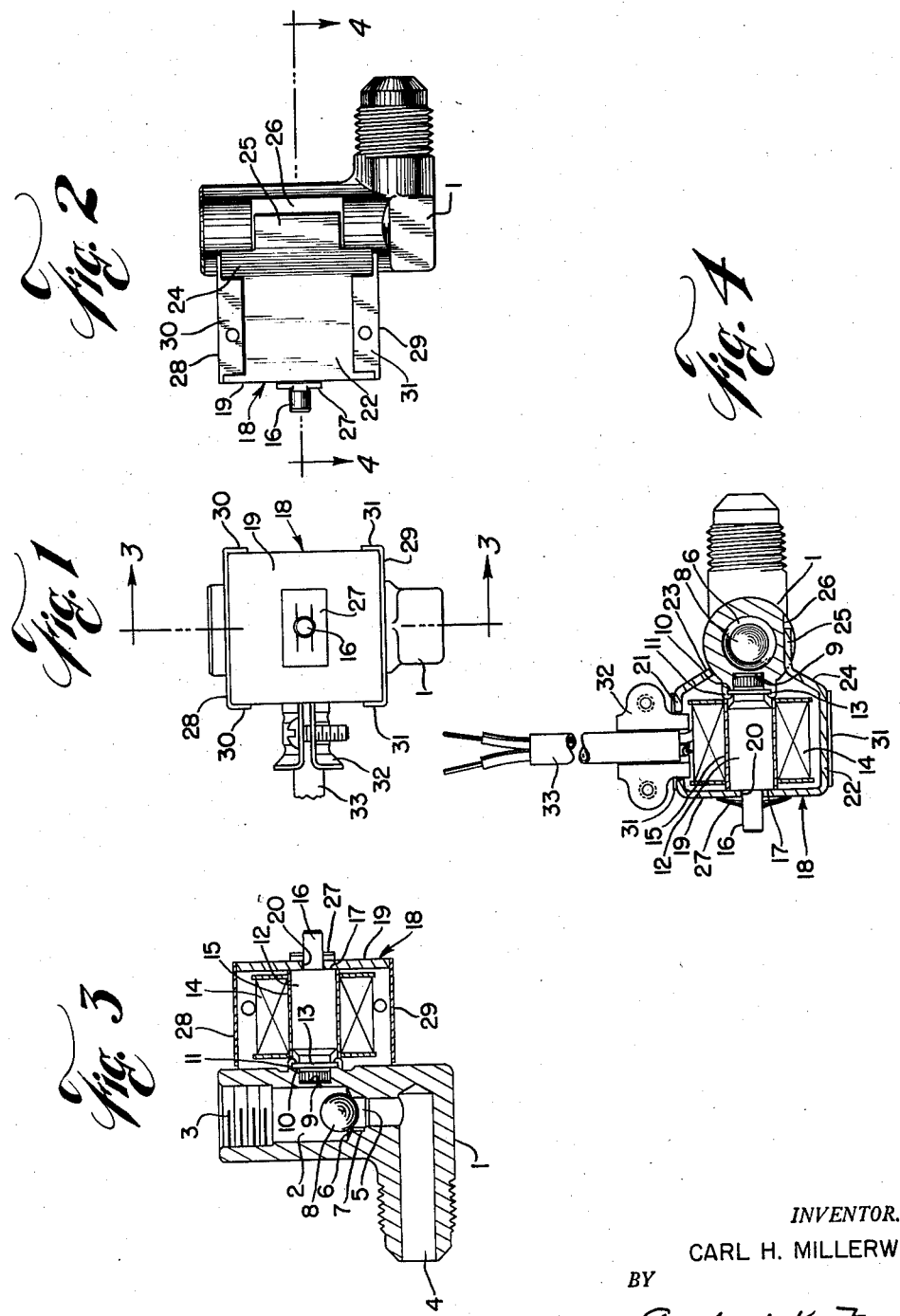
INVENTOR.
CARL H. MILLERWISE
BY
HIS ATTORNEY Oct. 21, 1958   C. H. MILLERWISE   2,857,127
SOLENOID VALVE
Filed July 28, 1954   2 Sheets-Sheet 2
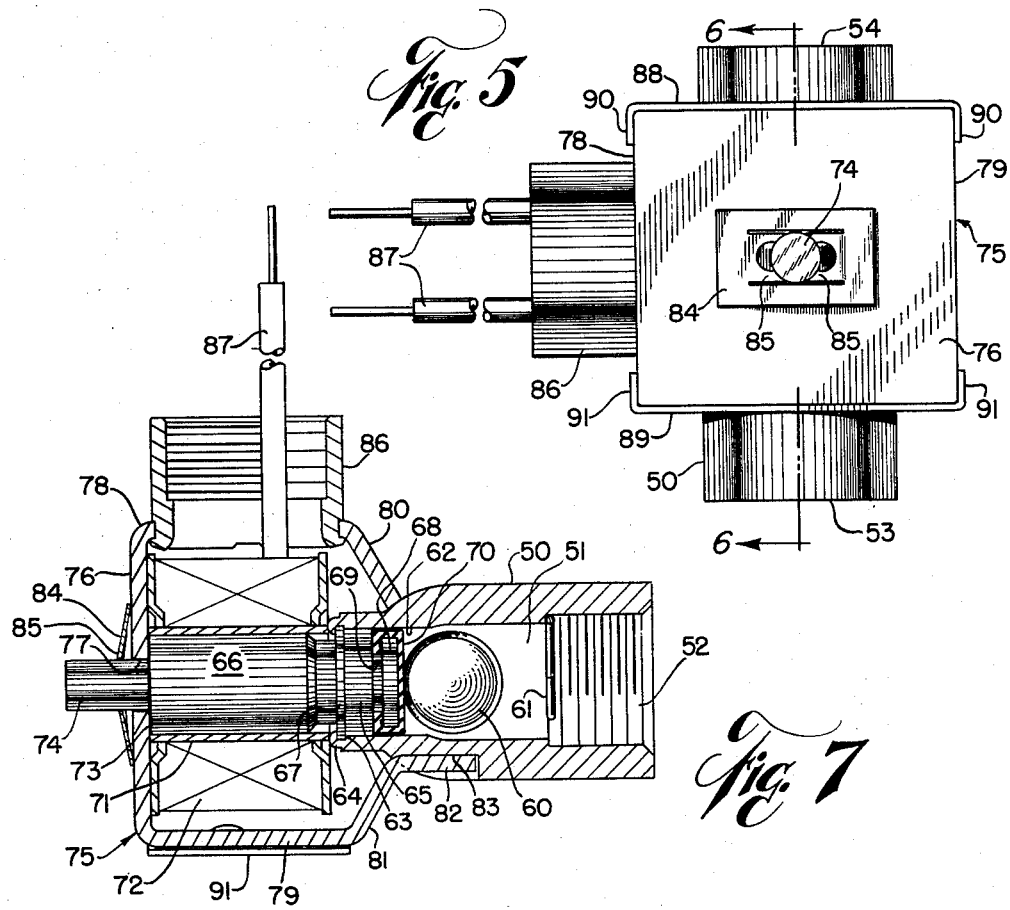
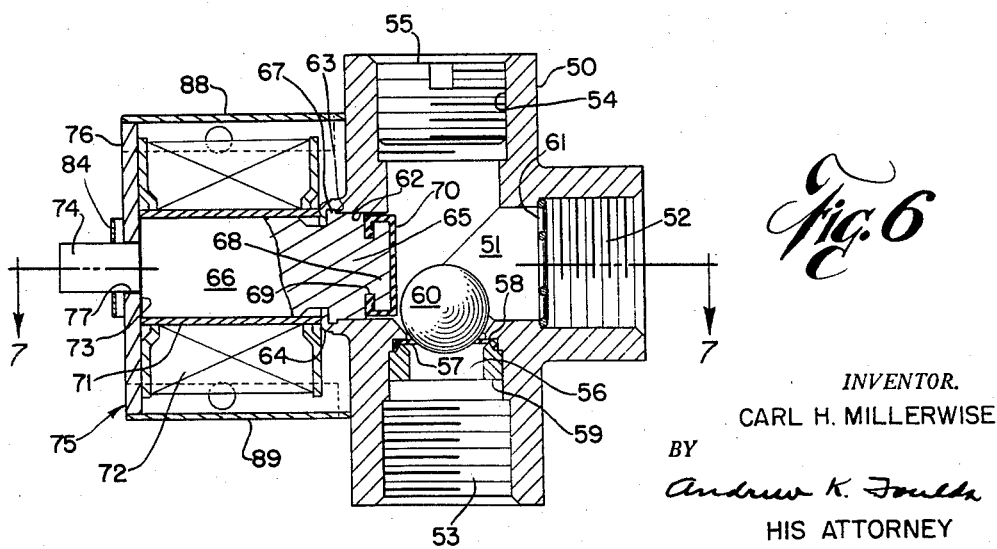
INVENTOR.
CARL H. MILLERWISE
BY
Andrew K. Foulds
HIS ATTORNEY

United States Patent Office 2,857,127
Patented Oct. 21, 1958

2,857,127

SOLENOID VALVE

Carl H. Millerwise, Detroit, Mich., assignor, by mesne assignments, to American Radiator & Standard Sanitary Corporation, New York, N. Y., a corporation of Delaware Application July 28, 1954, Serial No. 446,289

4 Claims. (Cl. 251—141)

This invention relates to new and useful improvements in electrically operated valves and more particularly to a ball type solenoid valve.

An object of the invention is to provide an electrically operated valve which is of simple and rugged construction and which may be easily assembled in manufacture.

Another object is to provide an electrically operated valve in which the ball valve member seats by gravity and is electrically moved from its seat.

Another object is to provide an electrically operated valve having a coil housing which provides a flux path.

The invention consists in the improved construction and cooperative relation of parts to be more fully described hereinafter and the novelty of which will be particularly pointed out and distinctly claimed.

In the accompanying drawings to be taken as a part of this specification, there are fully and clearly illustrated several preferred embodiments of the invention, in which drawings:

Figure 1 is a view in elevation of one form of the valve,

Fig. 2 is a view looking from right to left facing Fig. 1,

Fig. 3 is a view in section on the line 3—3 of Fig. 1,

Fig. 4 is a view in section on the line 4—4 of Fig. 2,

Fig. 5 is a view in elevation of another form of the valve,

Fig. 6 is a view in section on the line 6—6 of Fig. 5, and

Fig. 7 is a view in section on the line 7—7 of Fig. 6.

Referring to the drawings by characters of reference and particularly to Figs. 1 to 4, the numeral 1 designates a valve casing or body of non-magnetic material, such as brass. Through the casing there is a flow passageway 2 having an inlet 3 and an outlet 4. Within the passageway there is a vertically extending valve port 5 terminating in an upward facing annular shoulder 6 defining a valve seat. A bleed notch or groove 7 may be provided through the valve seat 6. Loosely positioned in the passageway 2 so that it is laterally and vertically movable, there is a ball valve member 8 of stainless steel which seats by gravity on the seat 6. The shoulder or seat 6 is dished or conical so that the ball member 8 will move accurately to its seat. In the side wall of the casing 1 above the valve seat and preferably with its centerline at the top or above the seated ball member 8, there is a cylindrical laterally extending opening or recess 9 having a bottom or end wall and having a surrounding annular seat or shoulder 10 at its open end with a surrounding cylindrical flange 11. Tightly fitting, as by a drive fit, in the recess 9 is the knurled end of a cylindrical metal post or core 12 of magnetic material. The core 12 has a collar or annular flange 13 formed thereon which seats on the shoulder 10. The cylindrical flange 11 is bent or turned over onto the collar 13 to clamp the core 12 tightly in the recess 9. A solenoid coil 14 is wound on a tubular sleeve member 15 which slidably fits on the core 12. The sleeve member 15 extends beyond the ends of the coil 14 and has one end seating against the turned over flange 11. The outer end portion 16 of the core 12 is of reduced diameter to provide a surrounding shoulder 17 at which the other end of the sleeve member 15 terminates.

Surrounding the coil 14 there is a housing or cover member 18 of sheet steel having a base portion or end wall 19 with an aperture 20 therethrough which slidably receives the reduced core end 16. The end wall 19 seats against the core shoulder 17 in overlying, abutting relation to the free end of the sleeve member 15 to hold the coil 14 on the core 12. The housing member 18 has parallel side walls 21, 22 with inturned end portions 23, 24, respectively, which abut the valve casing 1 on the opposite sides of the core inner end. Extending from the housing end portion 24, there is an arm 25 which laterally abuts the valve casing 1, seating against a flattened portion 26 of the exterior casing side wall. The housing member 18 is so dimensioned that the side wall 22 is tensioned thereby to hold the arm 25 resiliently against the valve casing flattened portion 26. The housing member 18 is held tightly on the core 12 and to the casing 1 by a clip member 27 of resilient sheet metal which is apertured to slip over and frictionally engage the core portion 16 and which has its opposite ends tensioned against the end wall 19. The open top and bottom of the housing member 18 are closed by cap members 28, 29, respectively, which have side flanges 30, 31, respectively, which frictionally engage the outside faces of the housing side walls. The housing side wall 21 has an aperture therethrough which receives a clamp 32 through which the coil lead wires 33 extend.

The operation of the valve of Figs. 1 to 4 is as follows: The housing 18 provides a flux path from the core 12 to the valve casing 1 through the arm 25. When the coil 14 is energized, the valve member 8 will be lifted and pulled laterally away from the seat 8 by magnetic attraction. While the coil 14 is energized, the ball valve member 8 will be held up against the side wall of the passageway 2 at the recess 9 in line with the end of the core 12. Upon deenergization or opening of the circuit of the coil 14, the valve member 8 will drop by gravity to the seat 6, thus closing the port 5, except for the bleed notch 7. Since the recess 9 does not open into the passageway 2, the passageway is sealed by the valve body at the coil connection.

Referring to Figs. 5, 6 and 7, the numeral 50 designates the valve casing or body of non-magnetic material, such as brass, having a passageway 51 therethrough with an inlet 52 and an outlet 53. Alined with the outlet 53, there is an alternate inlet 54 closed by a plug 55. In the passageway there is a vertically positioned downward opening valve port 56 having a flexible, annular valve seat member 57 of non-sticking, rubber-like or elastomeric material. Alined with the port 56, the passageway has an inward annular and horizontal projecting portion 58 forming a downward facing annular shoulder. The outer rim of the seat member 57 abuts the shoulder of portion 58 and is clamped and sealed thereagainst by a ring member 59 having a drive fit in the passageway 51. Within the passageway 51 and seatable downwardly upon the inner periphery of the seat member 57, there is a ball valve member 60 of magnetic material, such as stainless steel. The upper face of the portion 58 is downwardly dished or conical to provide clearance for the valve member. In the inlet 52, there is a wire guard member 61 to retain the valve member in the passageway 51. Alined with the inlet 51, the casing side wall has a cylindrical opening 62 therethrough with an annular outward facing shoulder 63 adjacent its outer end. The opening 62 is above the seat member 57 and preferably has its centerline substantially at the top of the seated valve member 60. A flange 64 surrounds the shoulder 63. Fitting tightly within and sealing the opening 62 is the inner end portion 65 of a cylindrical metal post or core 66 of magnetic material. Formed on the core 66 there is a surrounding collar or flange 67 which seats on the shoulder 63. The casing flange 64 is turned or bent over upon the collar 67 to clamp the core 66 to the valve casing and further seal the opening 62. The inner end of the core terminates in a reduced diameter head 68 separated from the main portion of the core by a circumferential groove 69. Surrounding and covering the head 68 and anchored in the groove 69, there is a cap 70 of rubber-like material which keeps the valve member 60 spaced from and out of contact with the core head 68. Slidably fitting on the core 66, there is a tubular metal sleeve member 71 on which the solenoid coil 72 is wound. The inner end of the sleeve member 71 abuts the turned over casing flange 64. The outer end of the sleeve member 71 terminates in the plane of an outward facing annular core shoulder 73 formed by a reduced diameter outer core end portion 74.

A housing or cover member 75 of sheet steel surrounds the coil 72 and has an end wall or base 76 with an aperture 77 therethrough which slidably fits on the core end portion 74 in abutting engagement with the core shoulder 73 and the outer end of the sleeve member 71. The housing wall 76 holds the sleeve member 71 against the casing flange 64. Extending from the housing wall 76, there are parallel side walls 78, 79 with inturned end portions 80, 81, respectively, which abut the valve casing 50 at the opposite sides of the core head 68. The side wall portion 81 terminates in an arm 82. The casing 50 has an exterior flat wall portion 83 against which the arm 82 laterally seats. The housing 75 is held to the valve casing with the wall 76 against the sleeve member 71 and the core shoulder 73 by a resilient metal clip member 84 which is apertured to slip over the core end portion 74. The clip member 84 is similar to the clip member 27 and has resilient tongues or fingers 85 which bite into and frictionally hold the clip member on the core portion 74. The ends of the clip member 84 are thus tensioned against the housing wall 76. The housing 75 is so dimensioned that when the wall 76 is against the core shoulder 73, the arm 82 will be laterally stressed or tensioned against the casing flat portion 83. The housing side wall 78 has an opening in which there is a conduit fitting 86 through which the solenoid coil lead wires 87 extend. The open top and bottom of the housing member 75 are closed by cap members 88 and 89, respectively, which have side flanges 90, 91, respectively, which overlie and frictionally engage the outer surfaces of the housing side walls.

The operation of the valve of Figs. 5, 6 and 7 is as follows: The housing member 75 by its engagement with the core 66 and the valve casing 50 provides a flux path. When the coil 72 is energized, the valve member 60 will be lifted and moved slightly laterally from its seat member 57, thereby opening the port 56. While the coil remains energized, the valve member will be held up against the end face of the cap member 70 which provides an "air gap" and also deadens the sound of valve operation. When the coil 72 is deenergized, the valve member 60 will be released and will drop by gravity onto its seat member 57 thus closing the port 56.

Having thus described the invention, what is claimed and is desired to be secured by Letters Patent of the United States is:

1. An electrically operable valve, comprising a body member having a passageway therethrough, valve seat means in said passageway, a ball valve member of magnetic material seatable on said means, said body member having a lateral opening above said seat means, a post member tightly fitting in said opening and projecting from said body member, said body member having an annular seat surrounding said opening and having a flange surrounding said seat, a collar on said post member engaging said annular seat, said flange being bent over upon said collar to hold said post member tightly to said body member, a solenoid coil positioned around and being laterally supported from said body member by said post member, and means holding said coil on said post member.

2. An electrically operable valve, comprising a body member having a passageway therethrough and having a flat side wall portion, valve seat means in said passageway, a ball valve member of magnetic material seatable on said means, said body member having a lateral opening above said seat means, a post member tightly fitting in said opening and projecting from said body member, a sleeve member fitting on said post member and having one end engaging said body member, a solenoid coil carried by said sleeve member, said solenoid coil and said sleeve member being laterally supported from said body member by said post member, a housing for said coil having an aperture receiving said post member and having an arm seating against said side wall portion, said housing engaging the other end of said sleeve member, and a resilient clip member on said post member and holding said housing against said sleeve member.

3. An electrically operable valve, comprising a body member having a passageway therethrough, valve seat means in said passageway, a ball valve member of magnetic material seatable on said means, said body member having a lateral opening above said seat means, a post member tightly fitting in said opening and projecting from said body member, said post member having adjacent its free end an outward facing annular shoulder and terminating in a reduced diameter portion, a solenoid coil positioned around and being laterally supported from said body member by said post member, said body member having a flat side wall portion above said seat means and at one side of said post member, a metal housing having an end wall with an aperture therethrough receiving said reduced post member portion, said end wall engaging said post member shoulder, said housing having parallel side walls with inturned end portions engaging said body member, one of said inturned end portions having an arm extending therefrom and laterally abutting said flat side wall portion, and resilient clip means secured on said reduced post member portion and engaging said housing end wall to hold said end wall against said post member shoulder.

4. An electrically operable valve, comprising a body member having a passageway therethrough and having a flat side wall portion, a flexible valve seat member in said passageway forming a valve port, a ball valve member of magnetic material seatable on said flexible seat member to close said port, said body member having a lateral opening into said passageway above said port, a post member tightly fitting in said opening and projecting from said body member, a cap member of rubberlike material on the inner end of said post member, a sleeve member fitting on said post member and having one end engaging said body member, a solenoid coil carried by said sleeve member, said solenoid coil and said sleeve member being laterally supported from said body member by said post member, a housing for said coil having an aperture receiving said post member and having an arm seating against said side wall portion, said housing engaging the other end of said sleeve member, and a resilient clip member on said post member and holding said housing against said sleeve member.

References Cited in the file of this patent

UNITED STATES PATENTS

| 2,056,322 | Hoppe | Oct. 6, 1936 |
| 2,288,912 | Mears | July 7, 1942 |
| 2,388,696 | Lacart | Nov. 13, 1945 |
| 2,491,905 | Roy | Dec. 20, 1949 |
| 2,543,455 | Goepfrich | Feb. 27, 1951 |
| 2,574,762 | Schell | Nov. 13, 1951 |
| 2,627,544 | Eck | Feb. 3, 1953 |
| 2,630,139 | Nagel | Mar. 3, 1953 |

FOREIGN PATENTS

| 323,738 | Germany | Aug. 3, 1920 |
| 1,011,205 | France | Apr. 2, 1952 |